March 22, 1927.
A. VAN L. VAN DEN HEUVELL
1,621,911
WEIGHING SCREW JACK FOR DETERMINING THE WHEEL PRESSURE OF VEHICLES
Filed Nov. 17, 1922
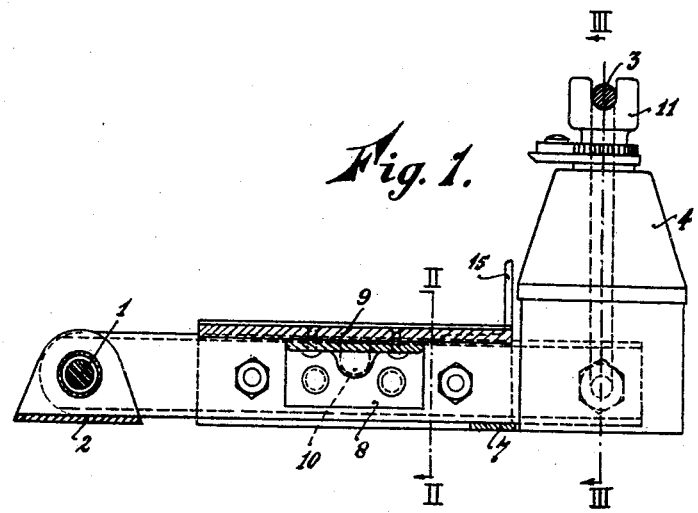
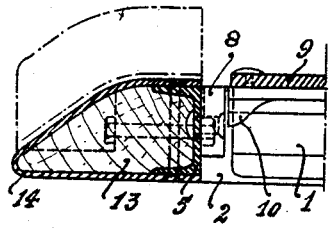 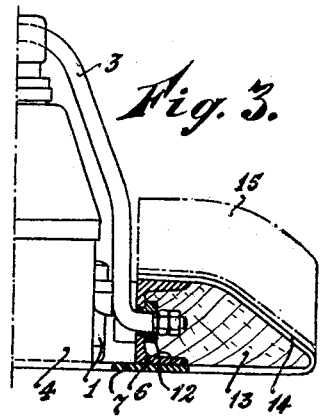
Inventor
A. van L. van den Heuvell
by Langner Parry Card & Langner
Attys.

Patented Mar. 22, 1927.

1,621,911

UNITED STATES PATENT OFFICE.

ABRAHAM VAN L. VAN DEN HEUVELL, OF ZWOLLE, NETHERLANDS.

WEIGHING SCREW JACK FOR DETERMINING THE WHEEL PRESSURE OF VEHICLES.

Application filed November 17, 1922, Serial No. 601,639, and in the Netherlands October 4, 1922.

Weighing-screw-jacks for determining the wheel-pressure of vehicles have been placed up to the present under the vehicle-axle or under the wheel-hub, of which the pressure on the road is to be determined.

It is self-evident that in this way it was not possible to obtain an exact indication of the wheel-pressure. Moreover the construction of many vehicles does not allow for the placing of the measuring-apparatus under the axle, whereas the use of the wheel-hub or axle-cap is neither always possible nor can it generally be allowed, because it should be avoided to prevent the risk of injury.

This invention has for its object to avoid these drawbacks by combining a screw-jack with a weighing-bridge, the latter consisting of a platform, on which the vehicle-wheel can be rolled and which is pivotally supported about a horizontal axis of a support resting on the road, whereas the other end can be lifted by a weighing-screw-jack.

In this way the pressure of the wheel is chosen as a starting point, so that as a matter of fact this pressure can be exactly determined.

As in ordinary weighing, the weight as indicated by a screw-jack is determined by a real wheel pressure and the distance of the supporting point of the wheel from the axis of rotation of the platform, so is necessary that the pressure of the wheel on the weighing bridge be always applied at the same point of the weighing bridge.

When the wheel-tire rests over its entire width on the platform, the point of application lies at the middle of the tire. This can, however, only be presumed with some certainty with narrow and elastic wheel-tires. It will, however, be difficult to comply with this requirement with wheels provided with wide tires or with two tires adjacent each other, but as a rule the supporting point will be near the middle of the wheel.

In order to avoid this difficulty according to this invention the upper surface of the platform is formed by a plate, centrally pivotable about an axis, parallel to the axis of rotation of the whole platform. It is clear that the pressure of the wheel will then always be applied at the fulcrum of the plate on the weighing-bridge. It is only necessary to take care that the wheel stands in the right place between the fulcrum of the weighing-bridge and the weighing-jack.

In order to facilitate the transport of the whole device, the construction is such that the plate can be easily removed from the weighing-bridge and the weighing-bridge can be easily removed from the weighing-jack.

According to this invention the platform has two frame-members of which the adjacent sides are provided with bearings open at the upper side, in which the pivots of the rotatable plate fit, and further, the platform is provided with a strap of which each of the ends is connected to one of the frame-members, whereas the fulcrum of the weighing-jack consists of a groove, in which the centre-piece of the strap fits.

In order to facilitate the rolling of the wheel on to the weighing-bridge and to obtain a strong and simple construction, according to the invention the frame-members of the platform are constructed of two channel irons with facing webs, said channels over a certain part of their length being filled with wooden blocks covered with sheet-iron on the upper side, and forming at either side of the platform sloping planes to the road.

The invention is illustrated in the accompanying drawings, in which

Fig. 1 is a longitudinal section of the entire apparatus,

Fig. 2 is a half cross-section on the plane II—II of Fig. 1 and

Fig. 3 is a half cross-section on the plane III—III of Fig. 1.

The apparatus comprises a platform, at one end pivotally supported by a support 2, while the other end rests on a weighing jack 4 by means of a strap 3. The jack can be of any usual design and may, for example, be of the construction shown in either of the U. S. Patents 1,112,320 or 268,797.

The platform is constructed of two frame-members 5 and 6 consisting of two channel-irons with facing webs, each of them being rotatable at one end about one of the ends of the axle 1 extending beyond the support 2 while they are fastened together at the other end by a plate 7, connected at the under side to the lower flange.

Centrally to each of these frame-members 5 and 6 is fastened a bearing piece 8, having a semicircular recess. The upper surface of the platform is formed by a plate 9, provided with two pivots 10, fitting in the recesses of the bearing pieces 8. This plate can thus turn about the axis of the pivots 10.

Through the ends of the frame-members lying near the weighing-screw-jack the ends of the strap 3 are passed, the latter fitting with its central part in a recess in the head 11 of the screw-spindle of the weighing-jack 4. Around the strap ends rings or sleeves 12 are provided, which are fastened in corresponding holes in the frame-members and serve to enlarge the bearing surface between the strap ends and frame members. On the ends of the strap 3 screw threaded nuts are screwed.

Between the flanges of the frame-members wooden filling-pieces 13 are provided, of which the part extending outside the flanges is formed as a sloping plane on the upper side.

The filling-pieces are covered with sheet-iron 14, while an edge 15 or angle-iron is riveted at the side of the weighing-jack 4 whereby the wheel to be rolled on to the platform cannot come into contact with the jack.

Claims:

1. An apparatus for measuring the wheel pressure of vehicles, comprising, a support, a horizontal axle carried by said support, a platform, means pivotally supporting the platform at one side on the horizontal axle, and a weighing jack positioned at the opposite side of the platform and directly connected thereto independently of said support for lifting the platform by tilting it about said axle.

2. An apparatus for measuring the wheel pressure of vehicles, comprising, a support, a horizontal axle carried by the support, a platform, means pivotally supporting the platform at one side on the horizontal axle, a weighing-jack positioned at the opposite side of the platform means connecting the platform to the weighing jack for lifting the platform, the upper surface of the platform being formed by a plate, a second axle parallel to the axis about which the whole platform turns, the plate being centrally rotatable about the second axle.

3. An apparatus for measuring the wheel pressure of vehicles, comprising, a support, a horizontal axle carried by the support, a platform, means pivotally supporting the platform at one side on the horizontal axle, a weighing-jack positioned at the opposite side of the platform means connecting the platform to the weighing jack for lifting the platform, the upper surface of the platform being formed by a plate, a second axle parallel to the axis about which the whole platform turns, the plate being centrally rotatable about the second axle, the platform having two frame members, bearing blocks positioned thereon, and openings in the bearing blocks for receiving the second axle.

4. An apparatus for measuring the wheel pressure of vehicles, comprising, a support, a horizontal axle carried by the support, a platform, means pivotally supporting the platform at one side on the horizontal axle, and a weighing-jack positioned at the opposite side of the platform for lifting the platform, the upper surface of the platform being formed by a plate, a second axle parallel to the axis about which the whole platform turns, the plate being centrally rotatable about the second axle, the platform having two frame members, bearing blocks positioned thereon, and openings in the bearing blocks for receiving the second axle, the platform being provided with a strap, of which each of the ends is secured to one of the frame members, a recessed support on the weighing-jack, part of the strap fitting this recessed support.

5. An apparatus for measuring the wheel pressure of vehicles, comprising, a support, a horizontal axle carried by the support, a platform, means pivotally supporting the platform at one side on the horizontal axle, a weighing-jack positioned at the opposite side of the platform, means connecting the platform to the weighing-jack for lifting the platform, the upper surface of the platform being formed by a plate, a second axle parallel to the axis about which the whole platform turns, the plate being centrally rotatable about the second axle, the platform having two frame members, bearing blocks positioned thereon, openings in the bearing blocks for receiving the second axle, the frame-members comprising two channel irons positioned with webs facing inwardly, the channels being filled, over a part of their length, with blocks, the blocks being covered at the upper side with sheet-iron and forming, at either side of the platform, planes sloping away from the platform.

6. An apparatus for measuring the wheel pressure of vehicles, comprising, a support, a horizontal axle carried by the support, a platform, means pivotally supporting the platform at one side on the horizontal axle, and a weighing-jack positioned at the opposite side of the platform for lifting the platform, the upper surface of the platform being formed by a plate, a second axle parallel to the axis about which the whole platform turns, the plate being centrally rotatable about the second axle, the platform having two frame members, bearing blocks positioned thereon, and openings in the bearing blocks for receiving the second axis, the platform being provided with a strap, of which each of the ends is secured to one of the frame members, a recessed support on the weighing-jack, part of the strap fitting this recessed support, the frame members comprising two channel irons positioned with webs facing inwardly, the channels being filled, over a part of their length, with blocks, the blocks being covered at the upper side with sheet iron and forming, at either side of the platform, planes sloping away from the platform.

In testimony whereof I affix my signature.

ABRAHAM v. L. v. D. HEUVELL.